(12) United States Patent
Ballabio et al.

(10) Patent No.: US 10,286,717 B2
(45) Date of Patent: May 14, 2019

(54) DOUBLE-SIDED SECURITY ELEMENT

(71) Applicant: FEDRIGONI SPA, Verona (IT)

(72) Inventors: Eligio Ballabio, Pietrasanta (IT); Alberto Belli, Milan (IT); Pasquale Pallotta, Fabriano (IT)

(73) Assignee: Fedrigoni SpA, Verona (VR) (IT)

( * ) Notice: Subject to any disclaimer, the term of this patent is extended or adjusted under 35 U.S.C. 154(b) by 0 days.

(21) Appl. No.: 15/571,751

(22) PCT Filed: May 4, 2015

(86) PCT No.: PCT/EP2015/059698
§ 371 (c)(1),
(2) Date: Nov. 3, 2017

(87) PCT Pub. No.: WO2016/177391
PCT Pub. Date: Nov. 10, 2016

(65) Prior Publication Data
US 2018/0134064 A1    May 17, 2018

(51) Int. Cl.
| | | |
|---|---|---|
| *B32B 3/00* | (2006.01) | |
| *B42D 25/351* | (2014.01) | |
| *B42D 25/43* | (2014.01) | |
| *B42D 25/369* | (2014.01) | |
| *B42D 25/355* | (2014.01) | |

(Continued)

(52) U.S. Cl.
CPC ......... *B42D 25/351* (2014.10); *B42D 25/355* (2014.10); *B42D 25/364* (2014.10); *B42D 25/369* (2014.10); *B42D 25/373* (2014.10); *B42D 25/378* (2014.10); *B42D 25/43* (2014.10); *B42D 25/435* (2014.10); *G06K 19/12* (2013.01); *G06Q 30/0185* (2013.01); *B42D 25/23* (2014.10); *B42D 25/24* (2014.10); *B42D 25/29* (2014.10)

(58) Field of Classification Search
CPC .... B42D 25/45; B42D 25/351; B42D 25/369; B42D 25/364; B42D 25/373; B42D 25/378; B42D 25/435; G06K 19/12; G06Q 30/0185

See application file for complete search history.

(56) References Cited

U.S. PATENT DOCUMENTS

2007/0087294 A1    4/2007   Graham et al.

FOREIGN PATENT DOCUMENTS

| CN | 101795870 A | 8/2010 |
|---|---|---|
| CN | 102781629 A | 11/2012 |

(Continued)

OTHER PUBLICATIONS

Russian Search Report issued in corresponding Russian Patent Application No. 2017134455/12(060629) dated Aug. 17, 2018.

(Continued)

*Primary Examiner* — Elizabeth E Mulvaney
(74) *Attorney, Agent, or Firm* — Knobbe, Martens, Olson & Bear, LLP

(57) ABSTRACT

A security element has a transparent film, a pattern of transparent and non-transparent regions on a first side of the transparent film, and a pattern of transparent and non-transparent regions on a second side of the transparent film. The pattern on the second side of the transparent film matches or is in register with the pattern on the first side of the transparent film. A color changing layer covers the pattern on at least one side of the first and second sides of the transparent film.

15 Claims, 2 Drawing Sheets

(51) Int. Cl.
*B42D 25/364* (2014.01)
*B42D 25/378* (2014.01)
*B42D 25/373* (2014.01)
*B42D 25/435* (2014.01)
*G06K 19/12* (2006.01)
*G06Q 30/00* (2012.01)
B42D 25/23 (2014.01)
B42D 25/24 (2014.01)
B42D 25/29 (2014.01)

(56) References Cited

FOREIGN PATENT DOCUMENTS

| | | |
|---|---|---|
| EP | 1 747 905 A2 | 1/2007 |
| EP | 1 886 834 B1 | 2/2008 |
| EP | 1886834 A1 | 2/2008 |
| WO | WO 95/10419 A1 | 4/1995 |
| WO | WO 97/47478 A1 | 12/1997 |
| WO | WO 2007/085808 A1 | 8/2007 |
| WO | WO 2009/010714 A1 | 1/2009 |
| WO | WO 2009010714 A1 | 1/2009 |
| WO | WO 2013/143009 A1 | 10/2013 |

OTHER PUBLICATIONS

Office Action received in connection with corresponding Chinese Patent Application No. 201580078788.0 dated Sep. 21, 2018.

DOUBLE-SIDED SECURITY ELEMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The invention relates to a security element which can have the form of strips or patches and which is used in connection with banknotes, official and unofficial documents like passports, ID-cards, bank and credit cards, checks, paper, coupons vouchers, tickets, packages or the like. Provision of the mentioned documents with the security element improves the protection against forgery.

Description of the Related Art

Security elements typically have different characteristics which may be recognized by visual inspection, such as colour changes, holographic pictures, characters, patterns, which may particularly develop a different appearance according to the angle and direction of the observation with the naked eye. This allows a quick and reliable detection of forgery without requiring any equipment. Therefore, observable effects shall be made prominent in occurrence, so that a missing optical effect is quickly recognized to quickly identify a forgery. Of course, the security element shall be very difficult—if not impossible—to copy, to reduce the potential of forgery.

In addition, security elements may contain characteristics adapted to be recognized by machines. Such characteristics are preferably invisibly provided in the security element, so that forgery of these characteristics is impeded. Magnetic codes based on different coercivity, patterns or the like are typical examples for such characteristics, however optical characteristics with invisible rays (e.g. UV- or IR light) may be used as such characteristics.

EP 1 467 873 B1 describes a method for manufacturing a substrate which is to be used as a security element. The manufacturing process includes the formation of a metallic layer on a first side of a transparent polymeric film. A resist layer made from a darkly coloured resist is then applied on the metallic layer, the resist layer forming areas on the metallic layer which are covered by the resists and areas on the metallic layer which are not covered by the resist and the metallic layer is exposed. Then, the metal is removed for the areas which are not covered by the resist by a demetallising process, so as to demetallised regions. Then a further layer of a polymeric liquid crystal material is applied on the resist layer and the demetallised regions. The layer of polymeric liquid crystal material is optically active and develops a colour change or colour shift depending on the angle of observation. Because the metallic layer is covered with the dark coloured resist layer in the metallic areas, the colour shift effect of the polymeric liquid crystal material is clearly visible in reflected light. On the other hand, the demetallised regions are clearly distinguishable from the metallic areas in transmitted light. In the known manufacturing method, the various layers are piled one upon the other on one side of the transparent film.

SUMMARY OF THE INVENTION

The invention provides an improved security element and a manufacturing method for it.

According to the invention, there is provided a security element having a transparent film, a pattern of transparent and non-transparent regions on a first side of the film, a pattern of transparent and non-transparent regions on a second side of the film, said pattern matching with the pattern on the first side of the film, and a color changing layer covering the pattern on at least one side of the film.

The invention provides a security element having at least two security features which are visually recognizable with the naked eye. One of these security features is a pattern which is recognizable in transmission, i.e. light transmitted through the security element. In brief, a person holding the security into the light and observing the side of the security element which is turned away from the light source will see a pattern which is made up from the transparent areas which appear lit in a dark surface.

This effect will be obtained independent from the side which is exposed to the light source. One reason for this effect is seen in that the patterns of non-transparent areas or regions are formed in register on both sides of the transparent film.

Furthermore, when the security element is observed in reflected light (i.e. the observer and the light source are on the same side of the security element) the side carrying the colour changing layer will show a colour changing effect of the portions which are covered with the colour changing layer. If the transmission of reflected light through the colour changing layer is suppressed, the layer will appear as a continuous layer changing its colour depending on the angle of observation.

The lower the amount of reflected light transmitted through the colour changing layer is, the more prominent or dominant is the colour changing effect. Thus, there is some dependency between visibility of the colour changing effect and the background on which the colour changing layer is applied.

In an advantageous modification, the pattern on the first side of the film may be composed of metallic regions and metal-free regions.

In the security element it may be beneficial to have a positive to negative correlation between the pattern in transmitted light and an observation of the security element in reflected light, i.e. the observer and the incident light are on the same side of the security element. In particular, if the non-transparent regions are made from metal, the observation of the security element in reflected light reveals a shiny or bright layer in which the metal-free regions appear dark to exhibit the same pattern in negative, if the observation of the pattern in transmitted light is defined as the positive, or vice versa.

In an advantageous modification of the security element, the pattern on the second side of the film is made of a coating responsive to light or radiation. In this case, the pattern consisting of transparent and non-transparent regions is formed on the first side of the film, and the layer formed on the second side of the film is made of a coating responsive to light or radiation. When the film is irradiated with the radiation from the first side of the film, the pattern formed on the first side of the film forms or acts as a mask having the pattern formed on the first side of the film. Therefore, selected local treatment of the layer of the made of a coating responsive to light or radiation provides a pattern in the second side of the film which is in accurate register with the pattern on the first side of the film.

Advantageously, the coating is a photo-resist, a varnish or an ink which either hardens or dissolves when exposed to light or radiation. In the case of the coating being adapted to dissolve when exposed to light or radiation, the light or radiation will reach the areas on the second side of the transparent film which are not masked, e.g. those areas which correspond to the transparent regions on the first side of the film. If the photo-resist is then exposed to radiation it dissolves or becomes chemically instable, e.g. soluble in particular liquids. Therefore, after exposure, the radiated portions of the second layer may be washed away using these liquids, while the portions which were not exposed to radiation remain stably on the second side of the film.

Advantageously, the color changing layer comprises at least one of a liquid crystal polymer, a thin film and a pigment ink. Any of these types of materials provide a colour changing effect, which means that the colour of the portion of the security element which is observed, changes its colour depending on the angle of observation of that portion of the security element. Typically, the span of the change in wavelength of the reflected light depending on the angle of observation—which exhibits the colour changing effect—is different for the individual materials, but is almost a constant span for the individual material. That means, suitably selecting the span of wavelength change within a spectrum of light can generate a desired colour change from one predetermined colour to another. Liquid crystal polymer is known for a strong colour changing effect and easy application, so that this material may be preferred, if these features are requested.

Advantageously, in the film provided with patterns on both sides of the film, the pattern on the second side of the film matches the pattern on the first side of the film as a positive copy, wherein non-transparent regions of both patterns coincide in shape and position. Alternatively, the pattern on the second side of the film matches the pattern on the first side of the film as a negative copy, wherein non-transparent regions of the pattern on one side of the film coincide with transparent regions of the pattern on the other side of the film in shape and position. Further alternatively the pattern on the second side of the film matches the pattern on the first side of the film alternately as a positive copy, wherein non-transparent regions of both patterns coincide in shape and position, and a negative copy wherein non-transparent regions of the pattern on one side of the film coincide with transparent regions of the pattern on the other side of the film in shape and position. In the security element it may be beneficial to have a positive to negative correlation between the pattern being observed in transmitted light and an observation of the security element in reflected light. By suitably selecting the relationship between the patterns positive or negative copies it is possible to define which difference in recognition of the patterns in reflected vs. transmitted light will be observed.

In an advantageous modification, the security element further comprises a magnetic material in the non-transparent regions of the pattern or in a separate magnetic layer, forming a machine readable information carrier or a so-called magnetic coding. The provision of magnetic materials to form the coding which is machine readable is an additional security feature which may be combined with the security element as described above. Since the magnetic material is typically non-transparent, it is advantageously arranged in non-transparent regions of the security element, which regions may be the non-transparent regions described above. This has the advantage that the magnetic coding will not interfere with the appearance of the security element obtained in transmitted light, and, as a further advantage, the magnetic coding may be hidden in connection with the non-transparent regions, so that the coding may not be recognized when visually inspecting the security element.

In an advantageous modification, in which the pattern on one side of the film is a metallic pattern which comprises metallic regions and metal-free regions, while the pattern on the other side of the film is made from a non-metallic material which is provided with magnetic material in the pattern itself or in a magnetic layer on the pattern, the metallic pattern and the magnetic material are also electrically isolated from each other by the interposed transparent film. A particular advantage of this situation is seen in the galvanic separation between the materials for the metallic layer and the magnetic layer or coding. Due to this separation, the formation of any local element which may cause contact corrosion is securely avoided. Therefore, the freedom of choice of the materials for the metallic layer and the magnetic layer or coding is larger. Furthermore, the lifetime of the security element is improved.

Advantageously, the non-transparent regions of the pattern underneath the color changing layer have a dark color. With the dark colour, the amount of light reflected by the non-transparent regions becomes low when inspecting the security element in reflected light, where the observer and the light source are on the same side of the security element, so that the wave-length selective reflection of light according to the angle of observation becomes dominant. This results in that the colour change is visible more clearly. Also, because there is almost no reflected light from the dark coloured regions, the effect is similar as to the transparent regions which also do not reflect the light. Therefore, the layer of colour changing materials exhibits a continuous appearance in which the patterns of transparent and non-transparent regions are invisible.

In an advantageous modification, a clear coating may be provided in the transparent regions of at least one of the patterns, or such clear coating completely covers at least one of the two patterns. In an advantageous modification of this, the clear coating may contain materials which have at least one of a fluorescent, a luminescent, and phosphorescent effect. In this way, a further security feature may be added to the security element. When the optically active (fluorescent, luminescent, phosphorescent) coating is provided only on one side of the security element, then the optical effect may be observed in the transparent regions of the pattern, when the suitable radiation (e.g. UV-light) is radiated on the side where the coating is applied and which is opposite to the observer (transmitted light) while the pattern may disappear when the radiation is applied on the side which carries the coating. For example, when using a fluorescent coating, signs or the like in the pattern may appears illuminated on the side of the observer which is opposite to the side on which the fluorescent coating is applied, when the security element is observed in transmitted UV-light.

In order to improve durability, at least one side of the film may be provided with a protective layer covering at least the pattern. The protective layer may be made from suitable materials including film materials, which may be applied to one or both sides of the security element as the outermost layers.

The invention also relates to a method for manufacturing a security element having a transparent film, a pattern of transparent and non-transparent regions on a first side of the film, a pattern of transparent and non-transparent regions on a second side of the film, said pattern matching with the pattern on the first side of the film, and a color changing layer covering the pattern on at least one side of the film, comprising the steps of forming a pattern on the first side of the film, applying a coating responsive to light or radiation on the second side of the film, exposing the coating through the transparent film to light or radiation using the pattern on the first side as a mask, removing the coating dissolved by the radiation to obtain the pattern on the second side of the film, and applying the color changing layer to cover the pattern on at least one side of the film.

With the method described, the transparent and non-transparent regions on both sides of the film are obtained in perfect register. This allows a clear and sharp definition of a safety feature in the form of a pattern observable in transmitted light, and it allows the application of several additional safety features like one or more optical active layers being provided on either side of the security element.

Advantageously, the pattern on the first side of the film comprises non-transparent regions formed from metal directly in a process of selected metallisation of the film. In this advantageous modification, the non-transparent regions made of metal are initially formed on the film surface, e.g. they are formed in their final shape by selectively providing metal to those regions. In this way, the number of process steps can be reduced.

It is also possible to form the metalised regions by initially providing a layer of metal and to selectively remove the metal from the designated transparent areas by demetallisation or removal of the metal from these regions using well known processes like masking, exposure, etching and/or washing.

It has been disclosed that several materials can be used in several layers in addition to the matching patterns on either side of the security element, and the colour changing layer on one side thereof, when putting the invention into practice. Therefore, adding of optically active layers and/or protection layers on one or both sides of the security element is also disclosed herewith.

BRIEF DESCRIPTION OF THE DRAWINGS

The invention will be described by way of preferred embodiments by reference to the drawings in which.

DETAILED DESCRIPTION OF THE PREFERRED EMBODIMENT

Figure 1:
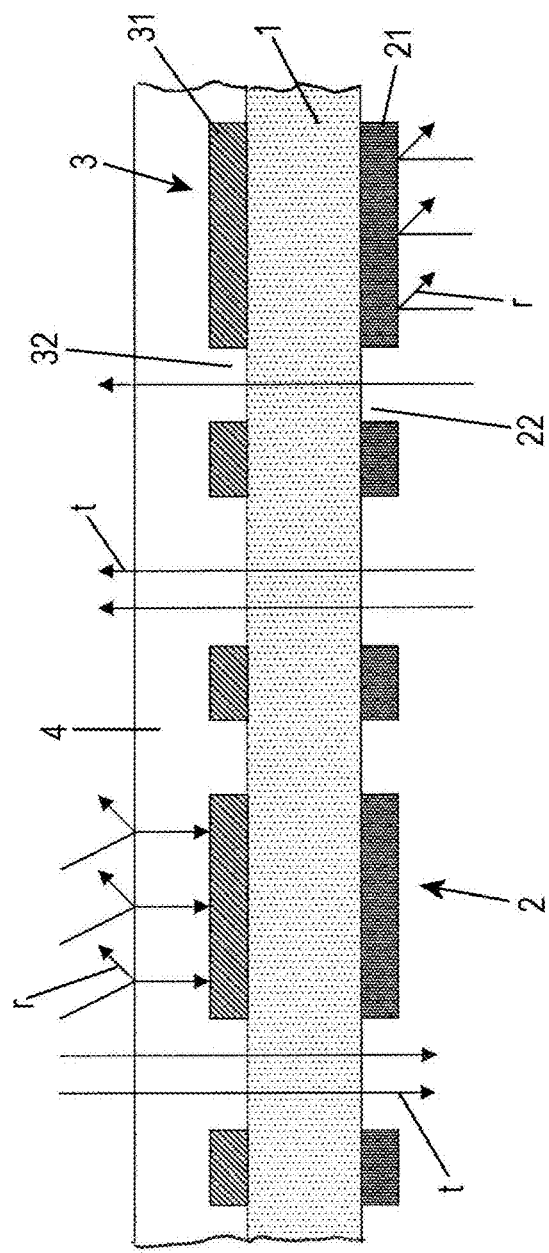
FIG. 1 is a sectional view of a security element according to an embodiment of the invention.

FIG. 1 shows a sectional view of a security element according to one embodiment of the invention. Reference sign A indicates the first side of a film 1 and B indicates a second side of a film 1. The film 1 is a transparent film which is made from PET and is used as a carrier for the security element.

As can be seen on the lower side of FIG. 1, a first pattern 2 is formed on the first side A surface of the film 1. The pattern 2 comprises non-transparent regions indicated with 21 and transparent regions indicated with 22 which transparent regions are formed as gaps in the pattern layer. The transparent regions or gaps 22 in the first pattern 2 form, together with the non-transparent regions 21, one or more pictures, symbols, letters, text, numbers or the like including combinations thereof.

The first pattern 2 can be made of metal or of other non-transparent, suitably applicable materials such as ink, varnish or pastes. In the present embodiment, the layer having the pattern 2 is made from metal. In this preferred embodiment, the blocks or non-transparent regions 21 of the pattern are directly formed from metal, leaving the transparent regions 22 free from metal during the manufacture of this layer. Alternatively, a metal layer may be applied first on the film and then a demetallisation process may be used to make the gaps 22 in the metal layer on the first side of the film 1.

On the second side B of the film 1, a second pattern 3 is formed which consists of non-transparent regions 31 and transparent regions 32. The second pattern 3 on the second side B of film 1 matches with or is in register with the first pattern 2 on the first side A of film 1. Matching defines a relation between the first 2 and the second pattern 3 being such that non-transparent regions of both patterns overlap, or that non-transparent regions of one pattern overlap the transparent regions of the other pattern. In this description, however, the term in register means, as can be seen in FIG. 1, that the non-transparent regions 21 and 31 of the first 2 and the second pattern 3 are in overlap, so as to have the edges of these regions being flush with each other over the film thickness.

The second pattern 3 can be obtained by using a material which is responsive to radiation. Responsive to radiation means that this material changes its state in response to being exposed to radiation which radiation may comprise any type of light and for example x-ray. The response to the exposure to radiation can be dissolving or break-down of the material, or hardening of the material. When the layer of the material for the second pattern 3 has been formed on the second side B of film 1, radiation is applied in FIG. 1 from the lower side, so that the first pattern 2 on the first side A of film 1 works as a mask for masking those regions of the material layer for the pattern 3 where it is to avoid that the material is exposed to the radiation applied from below in FIG. 1. After exposure to light or radiation, those portions of the material layer for the second pattern 3 which have been treated with radiation, are removed, so that the pattern 3 is formed.

FIG. 1 shows a further layer 4 which is applied on the second side B of film 1. This layer 4 is a colour changing layer which exhibits a colour change depending on the angle of observation.

The function of the security element shown in FIG. 1 is as follows:

When the security element is held against the light, this situation corresponds to the light falling on a first side A of the security element from below in FIG. 1. The observing person is on a second side B of the security element of FIG. 1. The light falling on the security element is split in transmitted light which is indicated with t passing through the security element, and light which can not pass through the security element which is indicated as reflected light r. Observing the security element in transmitted light t, it will display the patterns 2 and 3 by lit and dark regions which are formed by the transparent regions 22 and 32, and the non-transparent regions 21 and 31, respectively. Because the two patterns 2 and 3 are in register, the transmitted light t passing through the transparent film 1 can be observed in the form of the pattern being displayed. The pattern may have the form of text, patterns, symbols, picture(s), numbers or the like or combinations thereof.

When the light falls on the second side B of the security element from above in FIG. 1, the colour changing layer 4 will exhibit its colour changing effect. A part of the light reflected from the surface of the colour changing layer 4 is composed of particular wave-lengths, so that the observer observes a certain colour. The part of the light which is not reflected and can penetrate into the colour changing layer 4 will either pass through the transparent regions 32 in the second pattern 3 or will be absorbed by the non-transparent regions 31 of the second pattern 3.

If the amount of light which is reflected by the non-transparent regions 31 of the second pattern 3 is low, the total amount of reflected light from the pattern 3 is also low, because the transparent regions do not reflect any light. In this situation, the observed surface of the colour changing layer 4 appears as a continuously coloured surface. In order to obtain this effect, the non-transparent regions 31 of the second pattern 3 are made from a dark material, which has a high light absorbing capacity.

Accordingly, the security element shown in FIG. 1 shows two effects, that is, when it is held against the light, the first pattern 2 and second pattern 3 which are in register can be observed, whereas when light falls onto the security element, the colour changing layer 4 is dominantly observed.

The colour changing layer can be made of different suitable materials, for which polymeric liquid crystal material is an example. This material has the effect, that the reflected light r on the top layer of the security element in FIG. 1 is composed of light of different wave-lengths depending on the angle of reflection, so that a tilting movement of the security element in incident light will show a colour change of the observed portion of the security element.

Finally, if the security element of FIG. 1 is held against the light such that the incident light falls on the second side B where the observer is on a side A of the security element, the pattern formed by the first 2 and second pattern 3 will be clearly displayed.

If the incident light falls on the first side A of the security element in FIG. 1 and the observer is also on the first side A of the security element, the pattern 2 will be visible in the form of the negative copy of the pattern 2 in that the non-transparent regions 21 of the first pattern 2 appear bright while the transparent regions 22 of the first pattern 2 appear dark. This effect is further enhanced, if the first pattern 2 is made from metal which exhibits a strong light reflection property.

Figure 2:
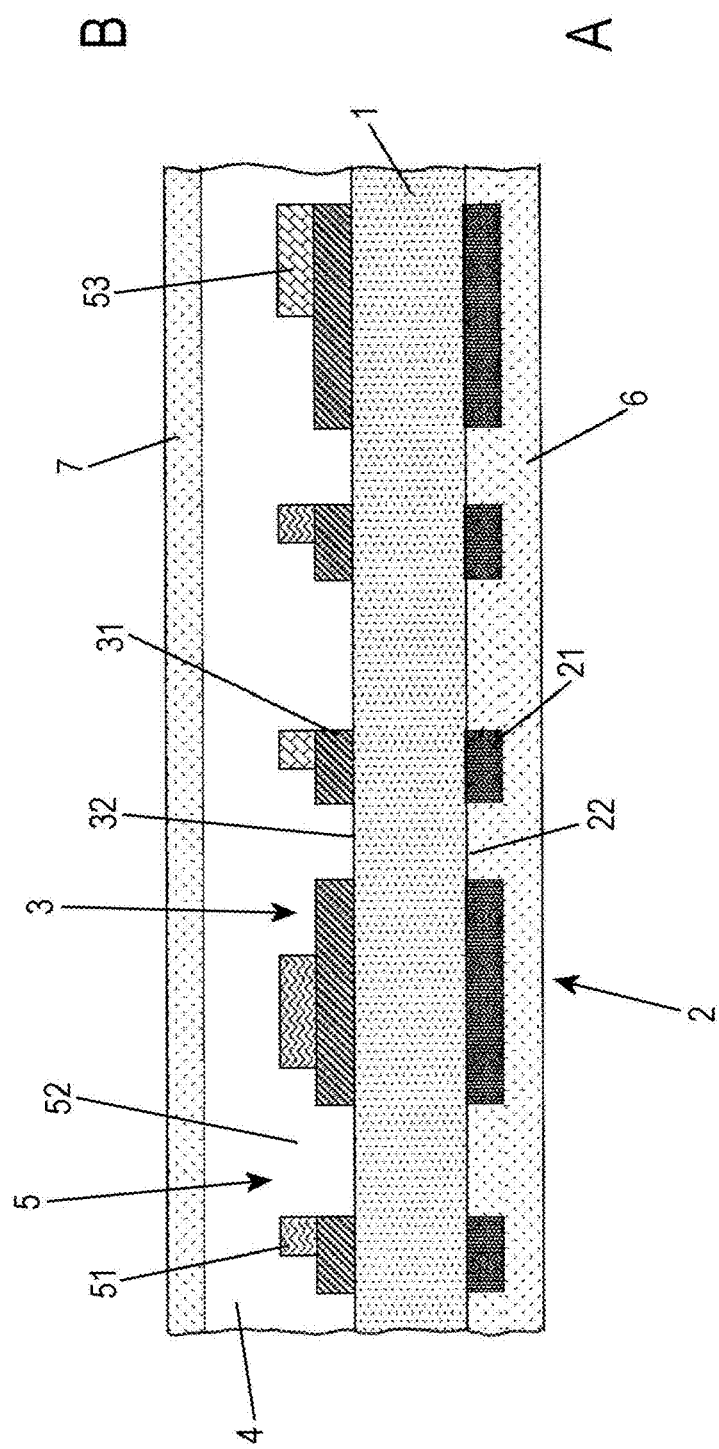
FIG. 2 is a sectional view of a security element according to a further embodiment of the invention.

A second embodiment of the security element will be described with reference to FIG. 2. FIG. 2 shows a sectional view of this embodiment. Elements which are similar to the first embodiment shown in FIG. 1 are indicated by the same reference signs, so that their detailed explanation given under reference to FIG. 1 applies here as well. Therefore unnecessary repetitions are avoided.

A transparent film 1 carries a first pattern 2 and a second pattern 3 on the first side A and the second side B, respectively. The first pattern 2 and the second pattern 3 are in register to form a text or the like, when observed in transmitted light. Also, a colour changing layer 4 is applied which covers the second pattern 3 on the second side B of the film 1.

In addition to the embodiment shown in FIG. 1, the present embodiment of FIG. 2 comprises a magnetic pattern 5 of magnetic materials which is formed from blocks 51 of a first magnetic material, gaps 52, and blocks 53 of a different magnetic material. The gaps and materials of the magnetic pattern 5 form a magnetic coding as a security feature which can be detected by suitable equipment.

In order that the magnetic pattern or coding 5 is invisible, the blocks 51, 53 of the magnetic material are arranged in the non-transparent regions 31 of the second pattern 3 so that they can not be observed in transmitted light. Additionally, the blocks 51, 53 of the magnetic coding 5 are made from a dark material similar as the non-transparent regions 31 of the second pattern 3.

Here, the colour changing layer 4 covers the non-transparent regions 31 and the magnetic material blocks 51, 53. As has been explained above, only the reflected light on the surface of the colour changing layer can be observed, because the light penetrating into the colour changing layer 4 will be absorbed or will pass through the transparent regions 32 of the pattern 3 and the transparent regions 22 of the pattern 2, so that the observer can not differentiate between transparent and non-transparent regions and the magnetic coding 5 is hidden under the colour changing layer 4.

With the regard to the optical performance of the embodiment of FIG. 2, reference can be made to FIG. 1 and the related description because the optical performance is the same.

Further to the structure of the embodiment of FIG. 1, on the first side of the transparent film 1, that is the lower side A in FIG. 2, a clear coating 6 is applied, which covers the first pattern 2 and forms a solid layer. The clear coating 6 may have only protection purpose, that is, it fills the gaps in the metal layer to provide a smooth surface which has an improved resistance.

The clear coating 6 is transparent but it may also be provided with additional optical effects such as a phosphorescent behaviour, a luminescent behavior or a fluorescent behavior. In this case, an additional security feature is added which can be observed when—for example—the clear coating 6 is exposed to a particular type of light which then causes a recognizable additional optical effect.

As can be further seen in FIG. 2, a protective layer 7 is applied on the colour changing layer 4. Such a protective layer can be a film or any other suitable substance which improves also the resistance of the colour changing layer in daily use of the security element. This protective layer typically is a clear layer which show no change of the optical effects of the security elements.

Although this is not discussed in detail here, the following modifications of the described embodiments shall be embraced by this description:

The first pattern 2 can be made of a material different from metal, it can be printed or applied in other form. The material for the first pattern 2 can be dark or can be light-coloured; for example a white colour can display the first pattern 2 brightly in reflected light.

Further layers may be added, for example a protective layer covering the the clear coating 6 may be added to the lower side in FIG. 2.

The magnetic coding 5 may consist of magnetic inks containing materials which have different coercivity, so as to provide further pieces of information in the magnetic code 5 which can be observed by suitably magnetizing/demagnetizing of the security element and observing the magnetic response.

The invention may be further modified in various embodiments within the skills of the person skilled in art and within the scope of the claims.

LIST OF REFERENCE SIGNS:

1 transparent film
A first side
2 first pattern
21 non-transparent regions
22 transparent regions B second side
3 second pattern
31 non-transparent regions
32 transparent regions
4 colour changing layer
t transmitted light
r reflected light
5 magnetic coding
51 blocks of first magnetic material
52 gap in magnetic material
53 blocks of second magnetic material
6 clear coating
7 protective layer

What is claimed is:

1. A security element comprising:
    a transparent film,
    a pattern of transparent and non-transparent regions on a first side of the film,
    a pattern of transparent and non-transparent regions on a second side of the film, said pattern on the second side of the film matching with the pattern on the first side of the film, and
    a color changing layer covering the pattern on at least one side of the film.

2. A security element according to claim 1, wherein the pattern on the first side of the film is composed of metallic regions and metal-free regions.

3. A security element according to claim 1, wherein the pattern on the second side of the film is made of a coating responsive to light or radiation.

4. A security element according to claim 3, wherein the coating is a photo-resist, a varnish or an ink which either hardens or dissolves when exposed to light or radiation.

5. A security element according to claim 1, wherein the color changing layer comprises at least one of a liquid crystal polymer, a thin film and a pigment ink.

6. A security element according to claim 1, wherein the pattern on the second side of the film matches the pattern on the first side of the film as a positive copy, wherein non-transparent regions of both patterns coincide in shape and position.

7. A security element according to claim 1, wherein the pattern on the second side of the film matches the pattern on the first side of the film as a negative copy, wherein non-transparent regions of the pattern on one side of the film coincide with transparent regions of the pattern on the other side of the film in shape and position.

8. A security element according to claim 1, wherein the pattern on the second side of the film matches the pattern on the first side of the film alternately as a positive copy, wherein non-transparent regions of both patterns coincide in shape and position, and a negative copy wherein non-transparent regions of the pattern on one side of the film coincide with transparent regions of the pattern on the other side of the film in shape and position.

9. A security element according to claim 1, further comprising a magnetic material in the non-transparent regions of the pattern or in a separate magnetic layer, forming a machine readable information carrier.

10. A security element according to claim 9, in which the pattern on one side of the film is a metallic pattern which comprises metallic regions and metal-free regions, while the pattern on the other side of the film is provided with magnetic material in the pattern or in a magnetic layer and is separated from the metallic pattern by the interposed transparent film.

11. A security element according to claim 1, wherein the non-transparent regions of the pattern underneath the color changing layer have a dark color.

12. A security element according to claim 1, wherein a clear coating is provided in the transparent regions of at least one of the patterns, or covers at least one of the patterns, the clear coating comprising materials having at least one of a fluorescent, a luminescent, and phosphorescent effect.

13. A security element according to claim 1, wherein at least one side of the film is provided with a protective layer covering at least the pattern.

14. A method for manufacturing a security element having a transparent film, a pattern of transparent and non-transparent regions on a first side of the film, a pattern of transparent and non-transparent regions on a second side of the film, said pattern on the second side of the film matching with the pattern on the first side of the film, and a dark color changing layer covering the pattern on at least one side of the film, comprising:
    forming a pattern on the first side of the film,
    applying a coating responsive to light or radiation on the second side of the film,
    exposing the coating through the transparent film to light or radiation using the pattern on the first side as a mask,
    removing the coating dissolved by the radiation to obtain the pattern on the second side of the film, and
    applying the dark color changing layer to cover the pattern on at least one side of the film.

15. A method according to claim 14, wherein the pattern on the first side of the film comprises non-transparent regions formed from metal directly in a process of selected metallization of the film.

\* \* \* \* \*